US012613959B2

(12) United States Patent
    Koseki

(10) Patent No.:  US 12,613,959 B2
(45) Date of Patent:      Apr. 28, 2026

(54) IMAGE PROCESSING DEVICE, ATTACK COUTERMEASURE METHOD, AND COMPUTER READABLE MEDIUM

(71) Applicant: Mitsubishi Electric Corporation, Tokyo (JP)

(72) Inventor: Yoshihiro Koseki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 87 days.

(21) Appl. No.: 18/903,315

(22) Filed: Oct. 1, 2024

(65) Prior Publication Data

US 2025/0028821 A1      Jan. 23, 2025

Related U.S. Application Data

(63) Continuation of application No. PCT/JP2022/020591, filed on May 17, 2022.

(51) Int. Cl.
    G06F 21/55          (2013.01)

(52) U.S. Cl.
    CPC ...... G06F 21/554 (2013.01); G06F 2221/034 (2013.01)

(58) Field of Classification Search
    CPC ... G06F 21/554; G06F 2221/034; G06T 7/00; G06N 20/00; G06V 10/761
    See application file for complete search history.

(56) References Cited

U.S. PATENT DOCUMENTS

| | | | |
|---|---|---|---|
| 2019/0311216 A1 | 10/2019 | Rampal | |
| 2019/0392268 A1* | 12/2019 | Tariq | ..................... G06V 20/56 |

| | | | |
|---|---|---|---|
| 2020/0394472 A1 | 12/2020 | Jia et al. | |
| 2021/0157912 A1* | 5/2021 | Kruthiveti Subrahmanyeswara Sai | .............. G06N 20/00 |
| 2021/0248241 A1* | 8/2021 | Balkanski | .............. G06V 20/95 |
| 2022/0164604 A1 | 5/2022 | Kanai et al. | |

FOREIGN PATENT DOCUMENTS

| | | |
|---|---|---|
| JP | 2019-536164 A | 12/2019 |
| JP | 2020-173624 A | 10/2020 |
| JP | 2020-181255 A | 11/2020 |

(Continued)

OTHER PUBLICATIONS

Liu, Jiang, et al. "Segment and Complete: Defending Object Detectors against Adversarial Patch Attacks with Robust Patch Detection." 2022 IEEE/CVF Conference on Computer Vision and Pattern Recognition (CVPR). IEEE, 2022. (Year: 2022).*

(Continued)

*Primary Examiner* — Michael Simitoski

(74) *Attorney, Agent, or Firm* — Birch, Stewart, Kolasch & Birch, LLP

(57)          ABSTRACT

A first detection unit (121) executes object detection for a subject image. A processing unit (130) generates a painted-out image per bounding box of the subject image by painting out the bounding box of the subject image. A second detection unit (122) executes, per painted-out image, object detection for the painted-out image. A determination unit (140) determines whether an adversarial example patch attack has been conducted, on a basis of a score value of each bounding box of the subject image and a score value of each bounding box of a painted-out image group.

8 Claims, 9 Drawing Sheets

(56) References Cited

FOREIGN PATENT DOCUMENTS

| JP | 2020-200033 A | 12/2020 |
| JP | 2021-5128 A | 1/2021 |

OTHER PUBLICATIONS

Xiang, Chong, and Prateek Mittal. "Patchguard++: Efficient provable attack detection against adversarial patches." arXiv preprint arXiv:2104.12609 (2021). (Year: 2021).*

Szegedy et al., "Intriguing properties of neural networks", International Conference on Learning Representations (ICLR), 2014, pp. 1-10.

The International Search Report (PCT/ISA/210) issued in PCT/JP2022/020591, mailed on Aug. 2, 2022.

Thys et al., "Fooling automated surveillance cameras: adversarial patches to attack person detection", The Bright and Dark Sides of Computer Vision: Challenges and Opportunities for Privacy and Security(CV-COPS), 2019, total 7 pages.

* cited by examiner

200:SUBJECT IMAGE

IMAGE PROCESSING DEVICE, ATTACK COUTERMEASURE METHOD, AND COMPUTER READABLE MEDIUM

CROSS REFERENCE TO RELATED APPLICATION

This application is a Continuation of PCT International Application No. PCT/JP2022/020591, filed on May 17, 2022, which is hereby expressly incorporated by reference into the present application.

TECHNICAL FIELD

The present disclosure relates to a countermeasure techniques against an adversarial example patch attack.

BACKGROUND ART

By performing object detection, a position of each object shown in an input image is indicated with using a bounding box, and a type (label) of each object is indicated.

In object detection tasks, deep learning techniques using neural networks have achieved extremely high accuracy in recent years.

An image classifier is constructed by deep learning. Also, adversarial example attacks against the image classifier are known.

An adversarial example attack applies perturbation to input data to falsify a classification result obtained from a multinomial classifier.

Non-Patent Literature 1 discloses an attack technique that is different from a technique of electronically applying perturbation to an input image in an object detection task.

According to this attack technique, an adversarial example patch printed with a perturbation image is physically placed. When an image obtained by photographing the image in which the adversarial example patch is physically placed is inputted, object detection is evaded.

CITATION LIST

Non-Patent Literature

Non-Patent Literature 1: Simen Thys, Wiebe Van Ranst, Toon Goedeme, Fooling Automated Surveillance Cameras: Adversarial Patches to Attack Person Detection, in The Bright and Dark Sides of Computer Vision: Challenges and Opportunities for Privacy and Security (CV-COPS) (2019)

SUMMARY OF INVENTION

Technical Problem

An objective of the present disclosure is to enable detection of an attack that has been conducted to obstruct object detection by using an adversarial example patch.

Solution to Problem

An image processing device of the present disclosure includes:

a first detection unit to execute object detection for a subject image so as to calculate a bounding box and a score value per object detected from the subject image;

a processing unit to generate a painted-out image per bounding box of the subject image by painting out the bounding box of the subject image, so as to obtain a painted-out image group;

a second detection unit to execute, per painted-out image, object detection for the painted-out image, so as to calculate a bounding box and a score value per object detected from the painted-out image; and a determination unit to determine whether an adversarial example patch attack of placing an adversarial example patch on the subject image has been conducted, on a basis of the score value of each bounding box of the subject image and the score value of each bounding box of the painted-out image group.

Advantageous Effects of Invention

According to the present disclosure, when an attack is conducted to obstruct object detection by using an adversarial example patch, the attack can be detected.

DESCRIPTION OF EMBODIMENTS

Figure 1:
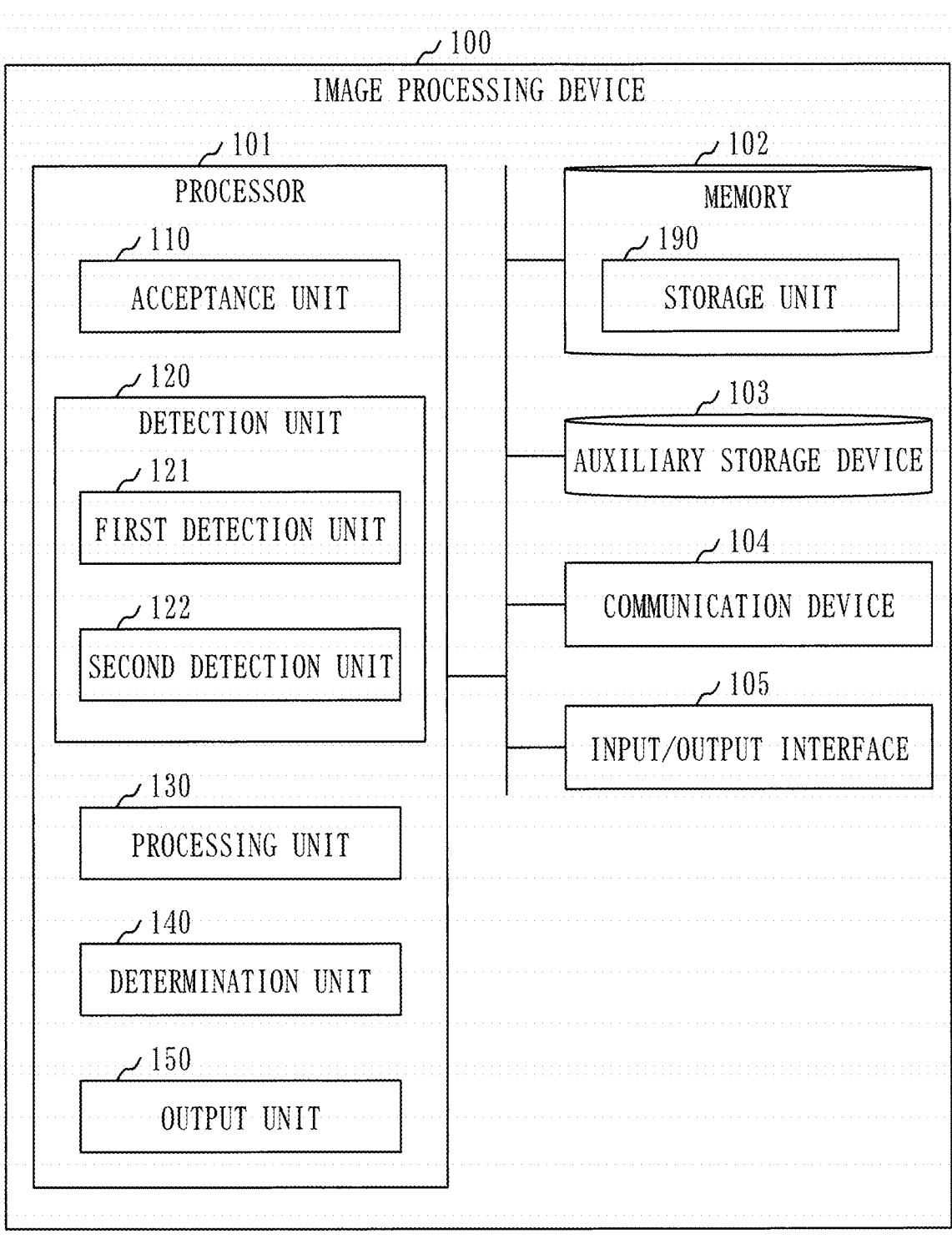
FIG. 1 is a configuration diagram of an image processing device 100 in Embodiment 1.

In the embodiment and drawings, the same or equivalent elements are denoted by the same reference sign. Explanation of an element denoted by the same reference sign as that for an explained element will arbitrarily be omitted or simplified. Arrows in the drawings mainly indicate data flows or process flows.

Embodiment 1

A countermeasure against an adversarial example patch attack will be described with referring to FIGS. 1 to 9.

*Description of Configuration*

A configuration of an image processing device 100 will be described with referring to FIG. 1. The image processing device 100 is also referred to as an attack countermeasure device.

The image processing device 100 is a computer provided with hardware devices such as a processor 101, a memory 102, an auxiliary storage device 103, a communication device 104, and an input/output interface 105. These hardware devices are connected to each other via a signal line.

The processor 101 is an IC that performs computation processing, and controls the other hardware devices. For example, the processor 101 is a CPU.

Note that IC stands for Integrated Circuit.

Note that CPU stands for Central Processing Unit.

The memory 102 is a volatile or nonvolatile storage device. The memory 102 is also called a main storage device or a main memory. For example, the memory 102 is a RAM. Data stored in the memory 102 is saved in the auxiliary storage device 103 as necessary.

Note that RAM stands for Random-Access Memory.

The auxiliary storage device 103 is a nonvolatile storage device. For example, the auxiliary storage device 103 is one or a combination of a ROM, an HDD, and a flash memory. The data stored in the auxiliary storage device 103 is loaded to the memory 102 as necessary.

Note that ROM stands for Read-Only Memory.

Note that HDD stands for Hard Disk Drive.

The communication device 104 is a receiver and a transmitter. For example, The communication device 104 is a communication chip or an NIC. The image processing device 100 performs communication by using the communication device 104.

Note that NIC stands for Network Interface Card.

The input/output interface 105 is a port to which an input device and an output device are to be connected. For example, the input/output interface 105 is a USB terminal, the input device is a keyboard and a mouse, and the output device is a display. Input to and output from the image processing device 100 are performed with using the input/output interface 105.

Note that USB stands for Universal Serial Bus.

The image processing device 100 is provided with elements such as an acceptance unit 110, a detection unit 120, a processing unit 130, a determination unit 140, and an output unit 150. The detection unit 120 is provided with a first detection unit 121 and a second detection unit 122. These elements are implemented by software.

The auxiliary storage device 103 stores an attack countermeasure program which causes the computer to function as the acceptance unit 110, the detection unit 120, the processing unit 130, the determination unit 140, and the output unit 150. The attack countermeasure program is loaded to the memory 102 and run by the processor 101.

The auxiliary storage device 103 further stores an OS. At least part of the OS is loaded to the memory 102 and run by the processor 101.

The processor 101 runs the attack countermeasure program while running the OS.

Note that OS stands for Operating System.

Input/output data of the attack countermeasure program is stored in a storage unit 190.

The memory 102 functions as the storage unit 190. Note that a storage device such as the auxiliary storage device 103, a register in the processor 101, and a cache memory in the processor 101 may function as the storage unit 190 in place of the memory 102 or together with the memory 102.

The image processing device 100 may be provided with a plurality of processors that replace the processor 101.

The attack countermeasure program can be computer-readably recorded (stored) in a nonvolatile recording medium such as an optical disk and a flash memory.

Figure 2:
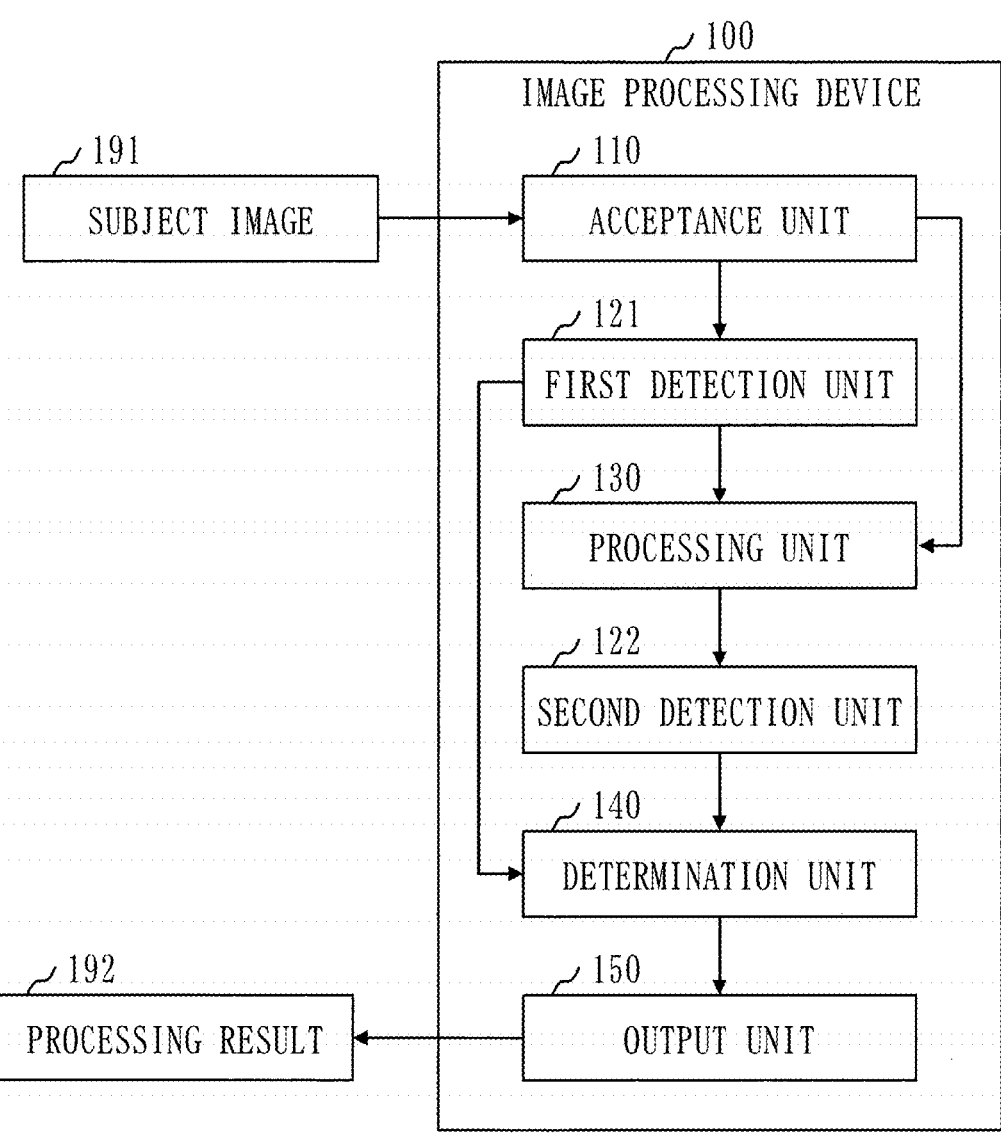
FIG. 2 is a function configuration diagram of the image processing device 100 in Embodiment 1.

FIG. 2 illustrates a function configuration of the image processing device 100.

Functions of individual elements of the image processing device 100 will be described later.

*Description of Operations*

A procedure of operations of the image processing device 100 corresponds to an attack countermeasure method. The procedure of the operations of the image processing device 100 also corresponds to a procedure of processes performed by the attack countermeasure program.

The attack countermeasure method will be described with referring to FIG. 3.

In step S110, the acceptance unit 110 accepts a subject image 191.

For example, a user inputs the subject image 191 to the image processing device 100. Then, the acceptance unit 110 accepts the inputted subject image 191.

The subject image 191 is an image to be processed in the attack countermeasure method.

The subject image 191 shows one or more objects. When an adversarial example patch attack is conducted, an adversarial example patch is placed on a portion of the object shown in the subject image 191.

An adversarial example patch attack places an adversarial example patch on an image so as to obstruct object detection for the image. The adversarial example patch attack is an instance of an adversarial example attack and is also called an attack or an adversarial patch attack.

The adversarial example patch is an instance of an adversarial example and is also called a patch or an adversarial patch.

In step S120, the first detection unit 121 executes object detection for the subject image 191.

Hence, a bounding box, a score value, and a label are calculated per object detected from the subject image 191. That is, one or more sets each consisting of a bounding box, a score value, and a label are calculated.

Object detection is a process of detecting one or more objects shown in the image. In object detection, a bounding box, a score value, and a label are calculated per detected object.

The bounding box indicates a region that contains the detected object. A position and range of the bounding box are identified by coordinate values in the image.

The score value expresses a reliability of the bounding box. The score value is also called a score or a reliability score.

The label expresses a type of the detected object.

For example, the first detection unit 121 takes the subject image 191 as input and actuates an object detector. The object detector is prepared in advance.

The object detector is built with using, for example, machine learning.

Specifically, the object detector is built with using deep learning. For example, the object detector corresponds to a learned model and is implemented by software.

As a technique for object detection, YOLO, SSD, Faster R-CNN, and so on are used.

Note that YOLO stands for You Only Look Once.

Note that SSD stands for Single Shot MultiBox Detector.

Note that R-CNN stands for Region Based Convolutional Neural Network.

In step S130, the processing unit 130 generates a painted-out image per bounding box of the subject image 191. Hence, a painted-out image group is obtained.

The painted-out image is the subject image 191 whose bounding box is painted-out. Specifically, the bounding box is painted out with a single color.

The painted-out image group includes one or more painted-out images.

The painted-out image group is obtained as follows.

First, the processing unit 130 selects each score value falling within a default range from among one or more score values of the subject image 191. The default range is a range that is predetermined for the score values.

Next, the processing unit 130 selects a bounding box corresponding to each selected score value.

Then, the processing unit 130 generates a painted-out image per selected bounding box.

In step S140, per painted-out image, the second detection unit 122 executes object detection for the painted-out image. A method for object detection is the same as the method in step S120.

Hence, a bounding box, a score value, and a label are calculated per object detected from the painted-out image. Namely, one or more sets each consisting of a bounding box, a score value, and a label are calculated.

In step S150, the determination unit 140 determines whether an adversarial example patch attack has been conducted, on a basis of the score value of each bounding box of the subject image 191 and the score value of each bounding box of the painted-out image group.

Figure 4:
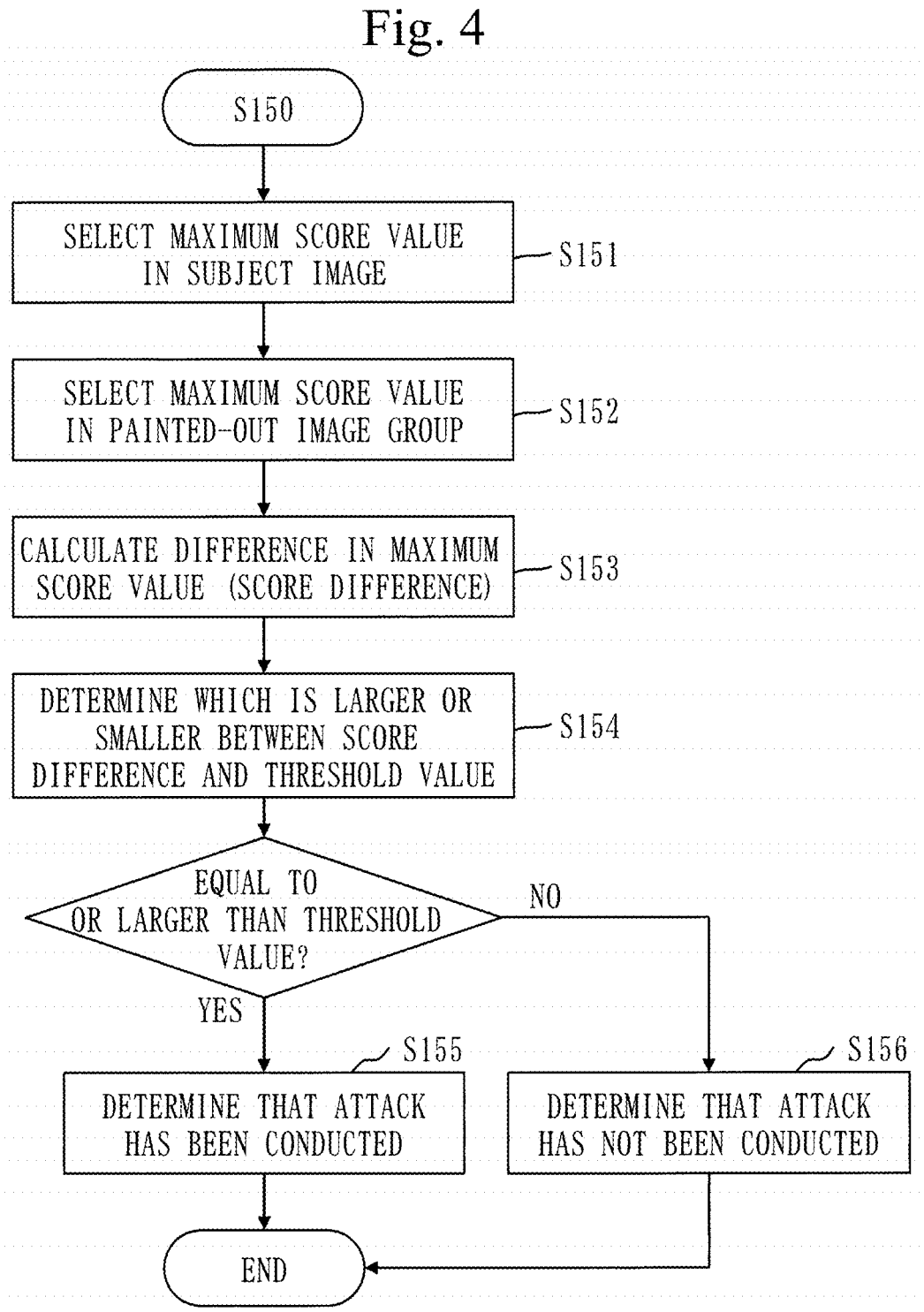
FIG. 4 is a flowchart of step S150 in Embodiment 1.

A procedure of step S150 will be described with referring to FIG. 4.

In step S151, the determination unit 140 selects a maximum score value in the subject image 191. That is, the determination unit 140 selects a maximum score value from among one or more score values of the subject image 191.

In step S152, the determination unit 140 selects a maximum score value in the painted-out image group. That is, the determination unit 140 selects a maximum score value from among one or more score values of the painted-out image group.

In step S153, the determination unit 140 calculates a difference between the maximum score value in the subject image 191 and the maximum score value in the painted-out image group. The calculated difference will be referred to as a score difference.

Specifically, the determination unit 140 calculates the score difference by subtracting the maximum score value in the subject image 191 from the maximum score value in the painted-out image group.

In S154, the determination unit 140 compares the score difference with a threshold value to determine which is larger or smaller between the score value and the threshold value. The threshold value is determined in advance.

If the score difference is equal to or larger than the threshold value, the processing proceeds to step S155.

If the score difference is less than the threshold value, the processing proceeds to step S156.

In step S155, the determination unit 140 determines that an adversarial example patch attack has been conducted.

In step S156, the determination unit 140 determines that an adversarial example patch attack has not been conducted.

Figure 3:
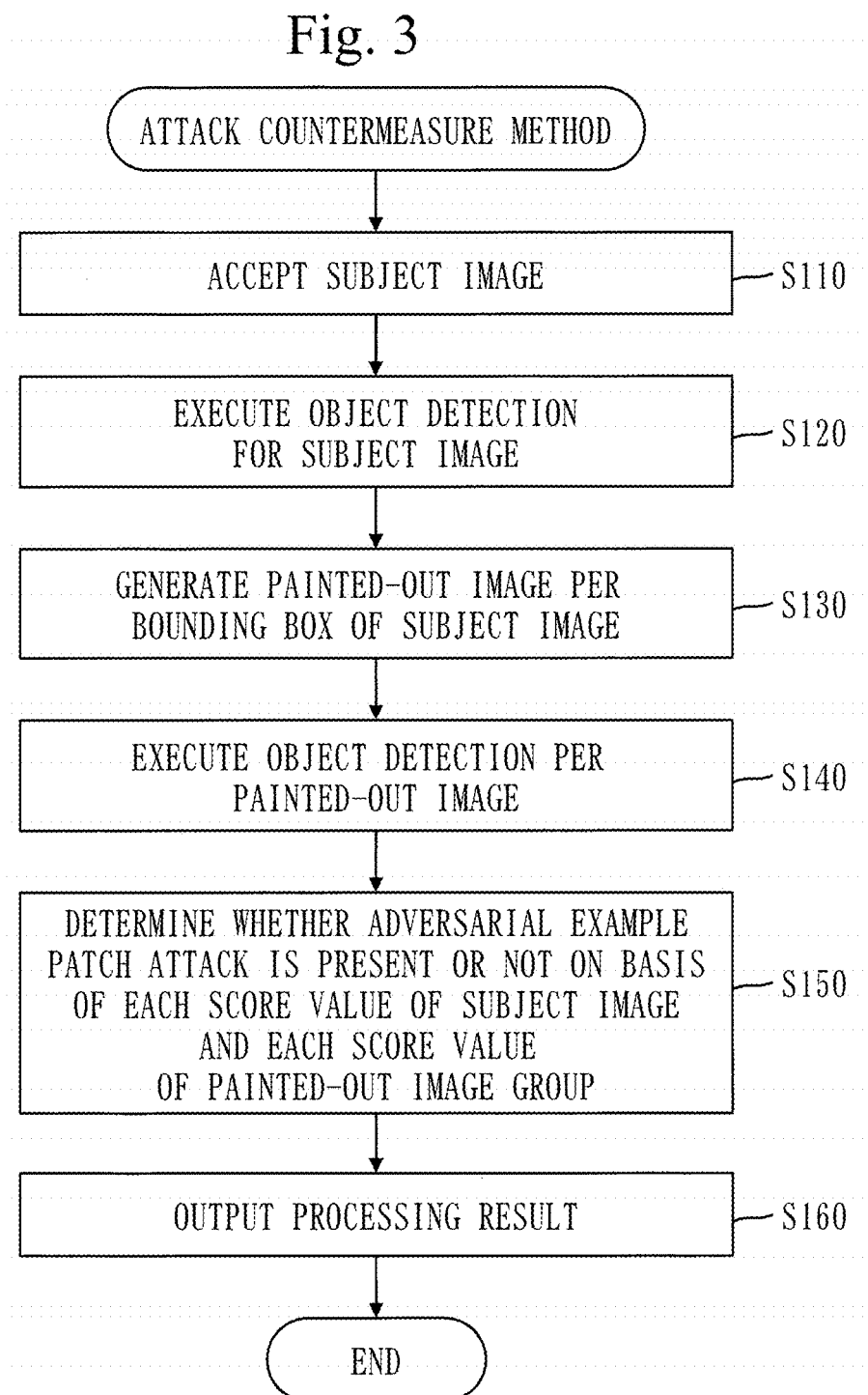
FIG. 3 is a flowchart of an attack countermeasure method in Embodiment 1.

Back to FIG. 3, explanation resumes.

The determination unit 140 transmits a determination flag and a detection result to the output unit 150. The output unit 150 accepts the determination flag and the detection result from the determination unit 140.

The determination flag and the detection result will be described later.

In step S160, the output unit 150 outputs a processing result 192. For example, the output unit 150 displays the processing result 192 onto a display.

The processing result 192 includes the determination flag and the detection result.

The determination flag indicates whether or not an adversarial example patch attack has been conducted.

If it is determined that an adversarial example patch attack has been conducted, the detection result shows a bounding box corresponding to the maximum store value in the painted-out image group and a result of object detection for the subject image 191.

The bounding box corresponding to the maximum score value in the painted-out image group serves as a candidate for a bonding box for the object shown in the subject image 191.

The result of object detection for the subject image 191 indicates a bounding box, a score value, and a label per object detected from the subject image 191.

If it is not determined that an adversarial example patch attack has been conducted, the detection result shows a result of object detection for the subject image 191.

The attack countermeasure method will be supplemented with referring to FIGS. 5 to 8.

Figure 5:
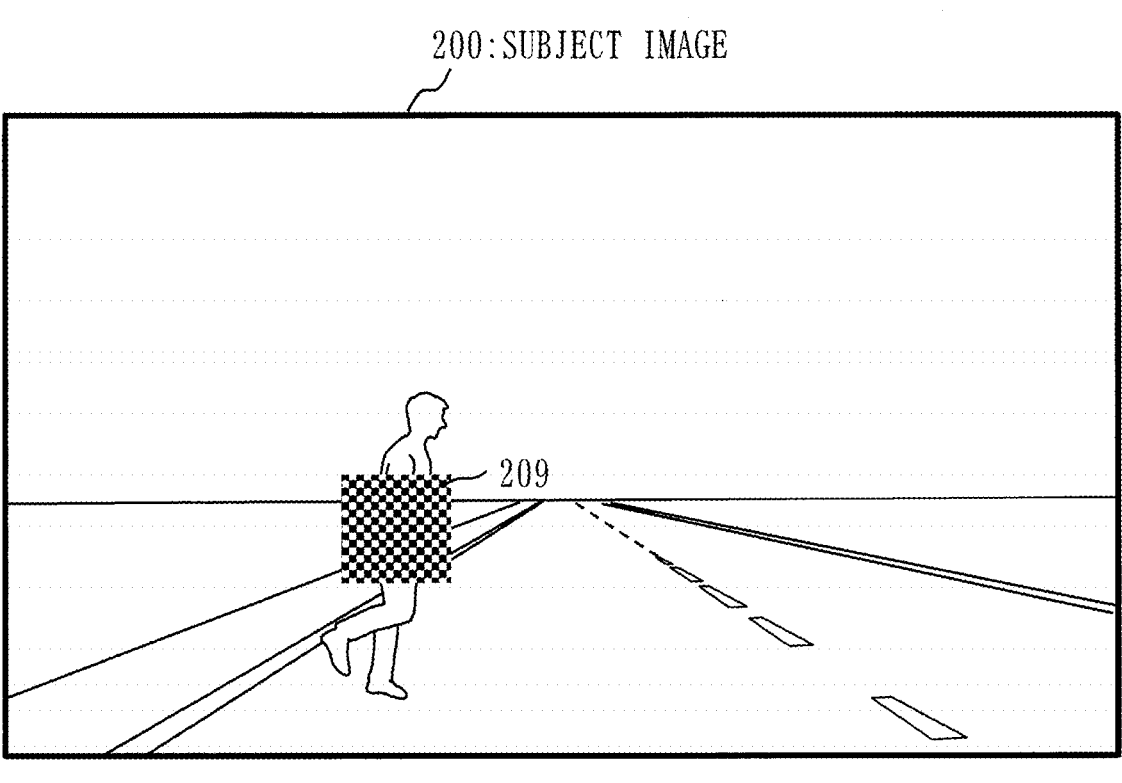
FIG. 5 is a diagram illustrating object detection for a subject image 200 in Embodiment 1.
Figure 5:
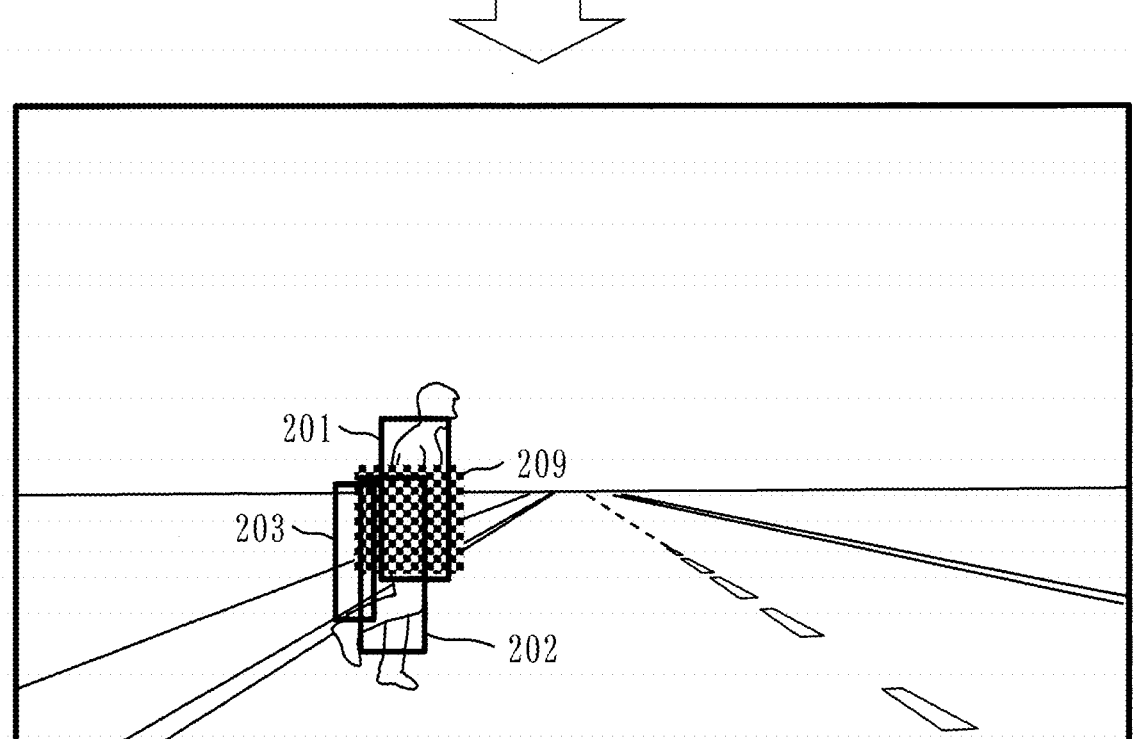

FIG. 5 illustrates a subject image 200. The subject image 200 is an instance of the subject image 191 that was subjected to an adversarial example patch attack.

The subject image 200 shows a person. The person is an instance of the object to be detected.

An adversarial example patch 209 is placed to overlap the person.

Bounding boxes (201 to 203) are bounding boxes calculated by object detection for the subject image 200.

Each bounding box has a low recognition score (score value) due to an influence of the adversarial example patch 209. However, each bounding box has a recognition score with a certain magnitude. The recognition score of each bounding box takes a value falling within the default range (0.1 or more to 0.6 or less).

Assuming that bounding boxes each having a recognition score within the default range appear near the adversarial example patch 209, the individual bounding boxes (201 to 203) are painted out.

Figure 6:
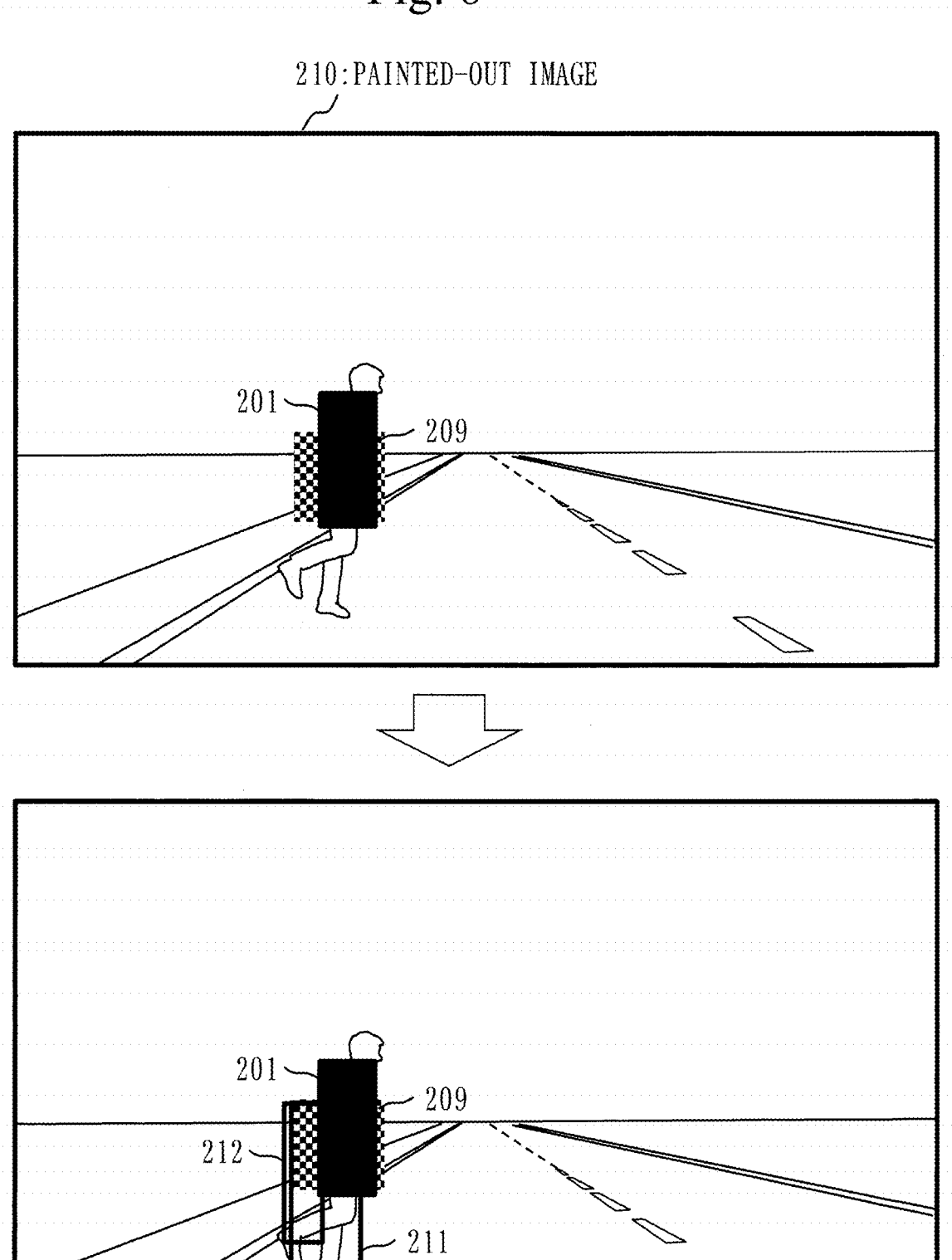
FIG. 6 is a diagram illustrating object detection for a painted-out image 210 in Embodiment 1.

FIG. 6 illustrates a painted-out image 210. The painted-out image 210 is a painted-out image that is obtained by painting out the bounding box 201.

Bounding boxes (211, 212) are bounding boxes calculated by object detection for the painted-out image 210.

Figure 7:
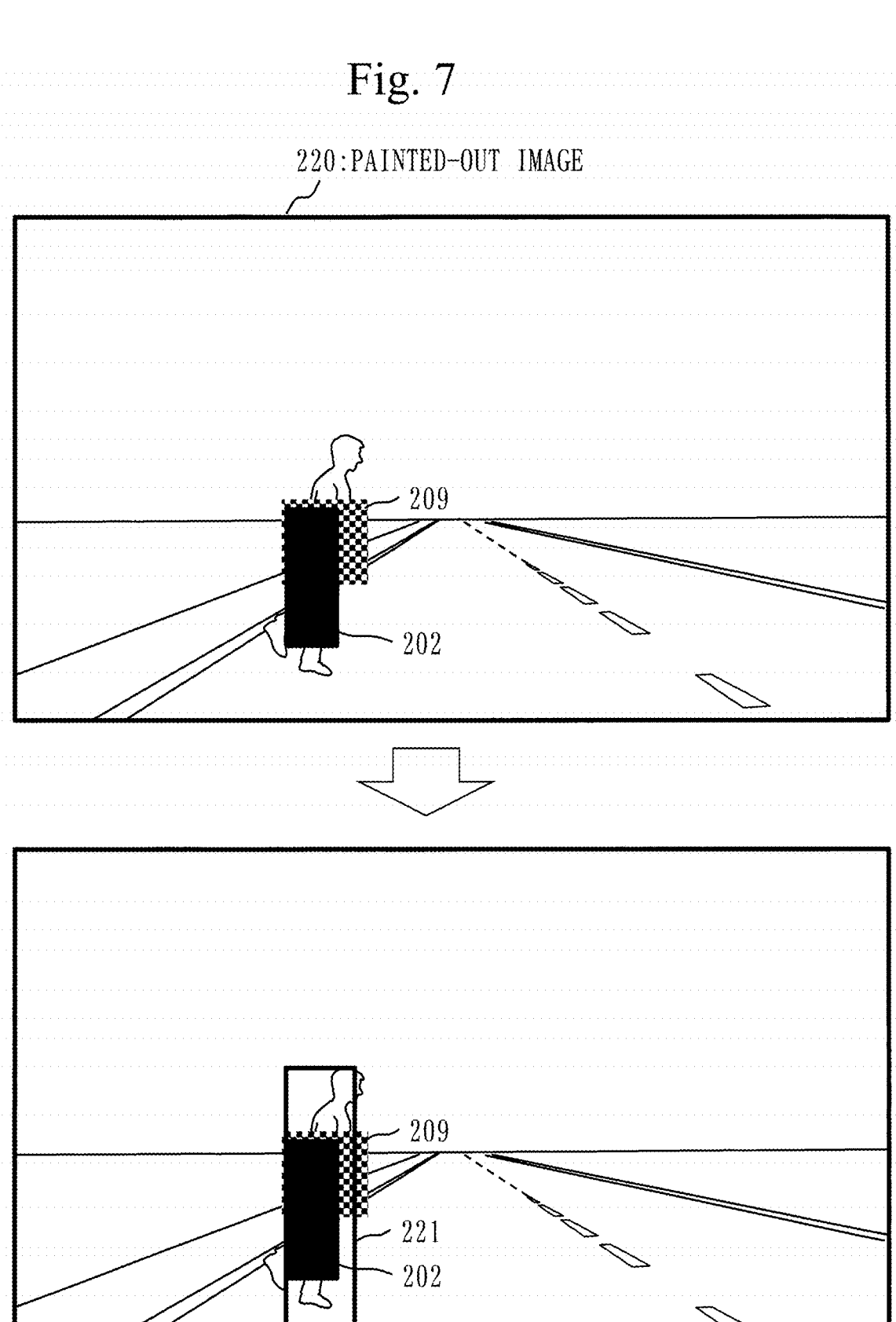
FIG. 7 is a diagram illustrating object detection for a painted-out image 220 in Embodiment 1.

FIG. 7 illustrates a painted-out image 220. The painted-out image 220 is a painted-out image that is obtained by painting out the bounding box 202.

A bounding box (221) is a bounding box that is calculated by object detection for the painted-out image 220.

Figure 8:
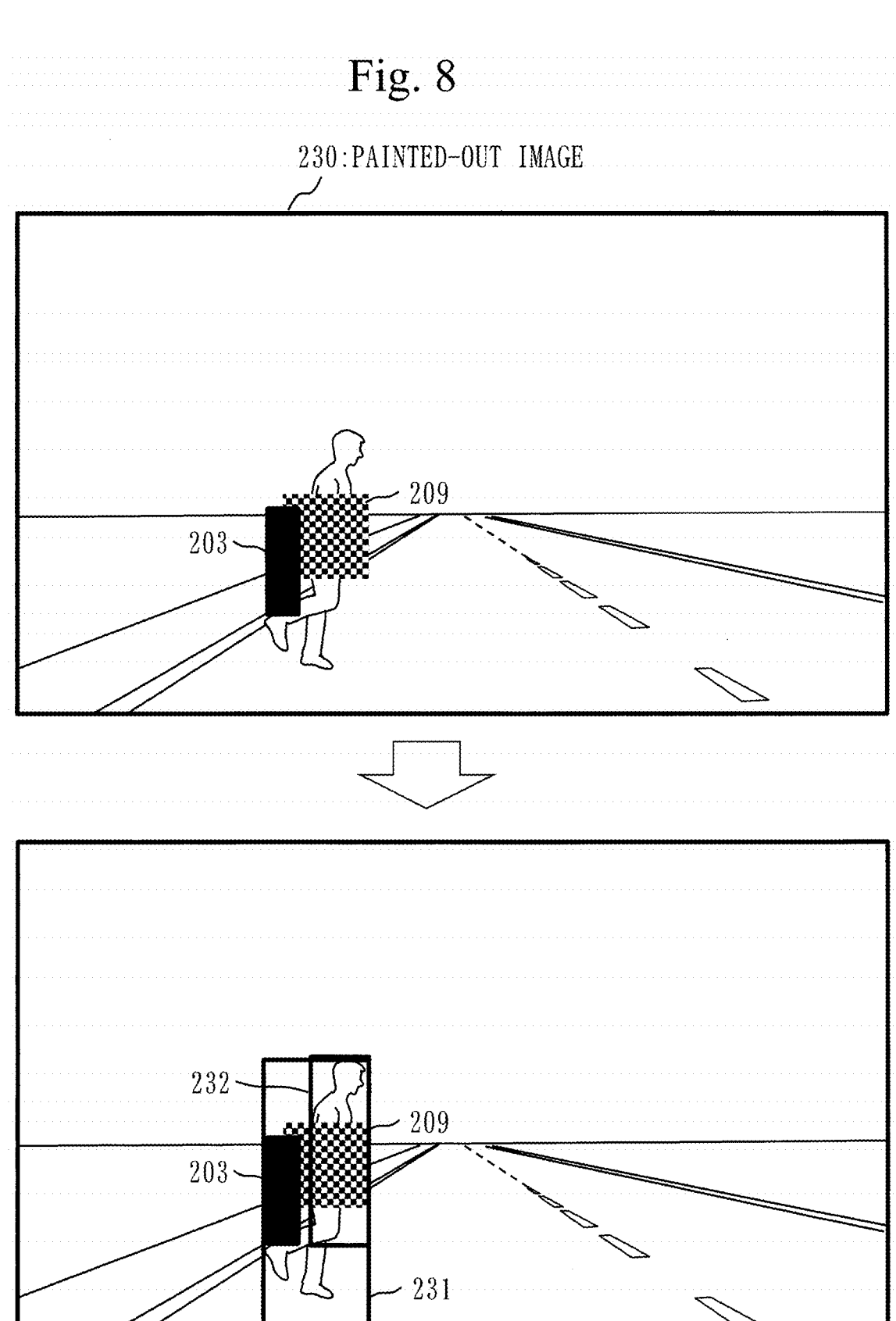
FIG. 8 is a diagram illustrating object detection for a painted-out image 230 in Embodiment 1.

FIG. 8 illustrates a painted-out image 230. The painted-out image 230 is a painted-out image that is obtained by painting out the bounding box 203.

Bounding boxes (231, 232) are bounding boxes that are calculated by object detection for the painted-out image 230.

If painting out covers the adversarial example patch 209 well, a recognition score of the bounding box corresponding to the person increases.

Therefore, the maximum value of the recognition score in the painted-out image group (210 to 230) is higher than the maximum value of the recognition score in the subject image 200.

For example, if the maximum value of the recognition score in the subject image 200 is 0.36 and the maximum value of the recognition score in the painted-out image group (210 to 230) is 0.64, this means that the maximum value of the recognition score has increased by 0.28.

Increase of the maximum value of the recognition score by about a certain degree by painting out means that the recognition score in the subject image 200 has been decreased by an adversarial example patch attack. Then, a bounding box corresponding to the maximum value of the recognition score in the painted-out image group (210 to 230) serves as a candidate for a bonding box corresponding to the person.

Effect of Embodiment 1

According to Embodiment 1, when an attack to obstruct object detection is conducted by using an adversarial example patch, it is possible to detect the attack.

Also, it is possible to output a candidate for a bounding box that should normally be outputted.

Characteristics of Embodiment 1

Embodiment 1 deals with an adversarial example patch attack against object detection.

The image processing device 100 estimates a position of an adversarial example patch on a basis of a score value of a bounding box which an object detector outputs for an input image. The image processing device 100 then paints out the estimated position, thereby decreasing an effect of the attack.

The object detector outputs, for the input image, coordinates expressing a position of the bounding box of each object, a label expressing a type of the object within the bounding box, and a score value corresponding to a probability serving as a certainty factor.

The image processing device 100 inputs an image to the object detector. The object detector calculates a bounding box and a score value.

If the score value falls within a predetermined threshold value range, the image processing device 100 generates an image in which a region in the corresponding bounding box is painted-out with a single color. One-frame image is generated per relevant corresponding bounding box.

The image processing device 100 inputs an image group that has been painted out to the object detector again. The object detector calculates a bounding box and a score value per inputted image.

If a maximum score value of a plurality of newly obtained score values exceeds the maximum score value of the original image by a predetermined amount or more, the image processing device 100 decides that the effect of the attack was decreased by painting out the adversarial example patch. Then, the image processing device 100 outputs attack detection. Furthermore, the image processing device 100 outputs a bounding box having the maximum score value in the image group that has been painted out, as a candidate for a bounding box of a subject that has been attacked.

First, the image processing device 100 calculates bounding boxes and score values of an image inputted for object detection.

Next, the image processing device 100 generates, per relevant bounding box, an image in which a bounding box whose score value falls within a certain range has been painted out.

Next, the image processing device 100 performs object detection again per generated image.

Then, when a difference in maximum score value between before and after painting out is equal to or larger than a predetermined threshold value, the image processing device 100 decides that an adversarial example patch attack has been conducted. In this case, the image processing device 100 outputs a flag expressing attack detection, and a bounding box having the maximum score value obtained after painting out.

Supplement to Embodiment 1

Figure 9:
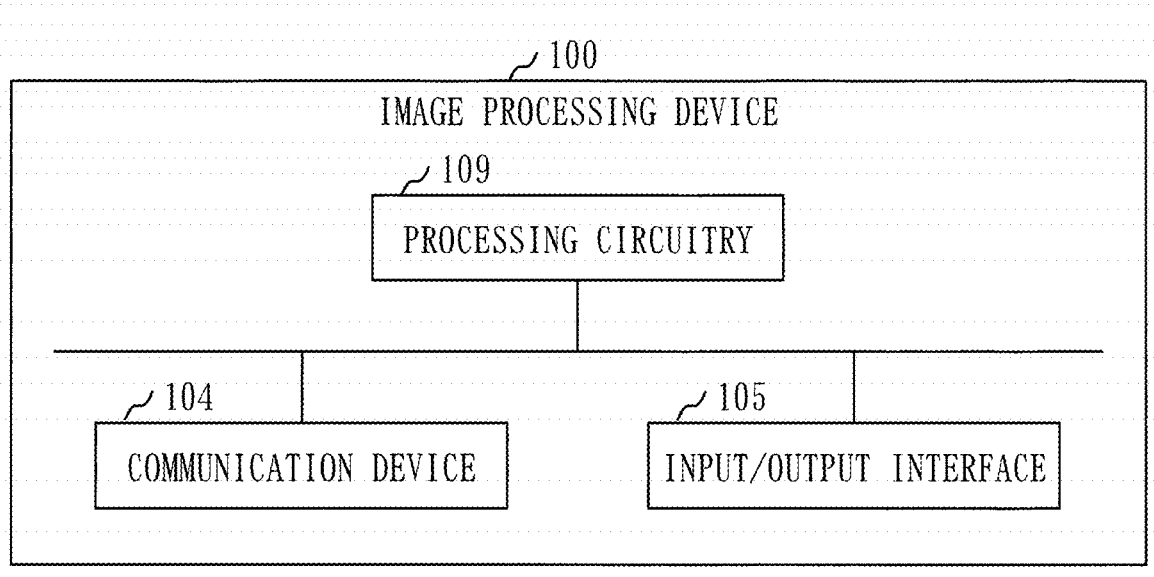
FIG. 9 is a hardware configuration diagram of the image processing device 100 in Embodiment 1.

A hardware configuration of the image processing device 100 will be described with referring to FIG. 9.

The image processing device 100 is provided with processing circuitry 109.

The processing circuitry 109 is hardware that implements the acceptance unit 110, the detection unit 120, the processing unit 130, the determination unit 140, and the output unit 150.

The processing circuitry 109 may be dedicated hardware, or may be a processor 101 that runs the program stored in the memory 102.

In a case where the processing circuitry 109 is dedicated hardware, the processing circuitry 109 is, for example, one or a combination of a single circuit, a composite circuit, a programmed processor, a parallel-programmed processor, an ASIC, and an FPGA.

Note that ASIC stands for Application Specific Integrated Circuit.

Note that FPGA stands for Field-Programmable Gate Array.

The image processing device 100 may be provided with a plurality of processing circuitries that substitute for the processing circuitry 109.

In the processing circuitry 109, some of the functions may be implemented by dedicated hardware, and the remaining functions may be implemented by software or firmware.

In this manner, the functions of the image processing device 100 can be implemented by one or a combination of hardware, software, and firmware.

Embodiment 1 is an exemplification of a preferred embodiment, and is not intended to limit the technical scope of the present disclosure. Embodiment 1 may be practiced partly, or may be practiced in combination with another embodiment. Procedures described with using flowcharts and so on may be changed appropriately.

The word "unit" in each element of the image processing device 100 may be replaced by "process", "stage", "circuit", or "circuitry".

REFERENCE SIGNS LIST

100: image processing device; 101: processor; 102: memory; 103: auxiliary storage device; 104: communication device; 105: input/output interface; 109: processing circuitry; 110: acceptance unit; 120: detection unit; 121: first detection unit; 122: second detection unit; 130: processing unit; 140: determination unit; 150: output unit; 190: storage unit; 191: subject image; 192: processing result; 200: subject image; 201: bounding box; 202: bounding box; 203: bounding box; 209: adversarial example patch; 210: painted-out image; 211: bounding box; 212: bounding box; 220: painted-out image; 221: bounding box; 230: painted-out image; 231: bounding box; 232: bounding box.

The invention claimed is:

1. An image processing device comprising processing circuitry to execute object detection for a subject image so as to calculate a bounding box and a score value per object detected from the subject image, to generate a painted-out image per bounding box of the subject image by painting out the bounding box of the subject image, so as to obtain a painted-out image group, to execute, per painted-out image, object detection for the painted-out image, so as to calculate a bounding box and a score value per object detected from the painted-out image, and to determine whether an adversarial example patch attack of placing an adversarial example patch on the subject image has been conducted, on a basis of the score value of each bounding box of the subject image and the score value of each bounding box of the painted-out image group.

2. The image processing device according to claim 1, wherein the processing circuitry selects each score value falling within a default range from among one or more score values of the subject image, selects the bounding box corresponding to each selected score value, and generates the painted-out image per selected bounding box.

3. The image processing device according to claim 2, wherein the processing circuitry selects a maximum score value in the subject image and a maximum score value in the painted-out image group, calculates a difference between the maximum score value in the subject image and the maximum score value in the painted-out image group, as a score difference, and determines whether the adversarial example patch attack has been conducted, on a basis of the score difference.

4. The image processing device according to claim 3, wherein the processing circuitry outputs a processing result indicating the bounding box corresponding to the maximum score value in the painted-out image group, when it is determined that the adversarial example patch attack has been conducted.

5. The image processing device according to claim 1, wherein the processing circuitry selects a maximum score value in the subject image and a maximum score value in the painted-out image group, calculates a difference between the maximum score value in the subject image and the maximum score value in the painted-out image group, as a score difference, and determines whether the adversarial example patch attack has been conducted, on a basis of the score difference.

6. The image processing device according to claim 5, wherein the processing circuitry outputs a processing result indicating the bounding box corresponding to the maximum score value in the painted-out image group, when it is determined that the adversarial example patch attack has been conducted.

7. An attack countermeasure method comprising:

executing object detection for a subject image so as to calculate a bounding box and a score value per object detected from the subject image;

generating a painted-out image per bounding box of the subject image by painting out the bounding box of the subject image, so as to obtain a painted-out image group;

executing, per painted-out image, object detection for the painted-out image, so as to calculate a bounding box and a score value per object detected from the painted-out image; and determining whether an adversarial example patch attack of placing an adversarial example patch on the subject image has been conducted, on a basis of the score value of each bounding box of the subject image and the score value of each bounding box of the painted-out image group.

8. A non-transitory computer readable medium recorded with an attack countermeasure program which causes a computer to execute:

a first detection process of executing object detection for a subject image so as to calculate a bounding box and a score value per object detected from the subject image;

a processing process of generating a painted-out image per bounding box of the subject image by painting out the bounding box of the subject image, so as to obtain a painted-out image group;

a second detection process of executing, per painted-out image, object detection for the painted-out image, so as to calculate a bounding box and a score value per object detected from the painted-out image; and a determination process of determining whether an adversarial example patch attack of placing an adversarial example patch on the subject image has been conducted, on a basis of the score value of each bounding box of the subject image and the score value of each bounding box of the painted-out image group.

* * * * *